United States Patent
Kitamura et al.

(10) Patent No.: US 10,491,072 B2
(45) Date of Patent: Nov. 26, 2019

(54) INNER-ROTOR-TYPE MOTOR AND ELECTRIC TOOL PROVIDED WITH SAME

(71) Applicant: PANASONIC INTELLECTUAL PROPERTY MANAGEMENT CO., LTD., Osaka (JP)

(72) Inventors: Kota Kitamura, Mie (JP); Hiroyuki Tsubakimoto, Mie (JP); Ryohei Oishi, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 221 days.

(21) Appl. No.: 15/529,016

(22) PCT Filed: Nov. 11, 2015

(86) PCT No.: PCT/JP2015/005618
§ 371 (c)(1),
(2) Date: May 23, 2017

(87) PCT Pub. No.: WO2016/084319
PCT Pub. Date: Jun. 2, 2016

(65) Prior Publication Data
US 2017/0264159 A1 Sep. 14, 2017

(30) Foreign Application Priority Data
Nov. 28, 2014 (JP) .................................. 2014-241629

(51) Int. Cl.
*H02K 5/16* (2006.01)
*H02K 29/08* (2006.01)
(Continued)

(52) U.S. Cl.
CPC ............... *H02K 5/163* (2013.01); *H02K 1/18* (2013.01); *H02K 3/34* (2013.01); *H02K 5/08* (2013.01);
(Continued)

(58) Field of Classification Search
CPC ............................... H02K 5/163; H02K 5/15; H02K 5/04; H02K 5/14; H02K 5/16; H02K 15/03;
(Continued)

(56) References Cited

U.S. PATENT DOCUMENTS 9,509,195 B1 * 11/2016 Edsinger ................ H02K 11/22
2014/0346903 A1 * 11/2014 Yim ...................... F04D 25/062
310/43

FOREIGN PATENT DOCUMENTS

DE  202016101878 U1 * 7/2016
DE  102017210019 A1 * 12/2017
(Continued)

OTHER PUBLICATIONS

International Search Report and Written Opinion issued in International Patent Application No. PCT/JP2015/005618, dated Feb. 2, 2016; with partial English translation.

*Primary Examiner* — Forrest M Phillips
(74) *Attorney, Agent, or Firm* — McDermott Will & Emery LLP

(57) ABSTRACT

An inner-rotor-type motor is configured such that a projecting portion is formed on an inner circumferential surface of a housing, a recess portion is formed on an outer circumferential surface of a stator, the stator is positioned with respect to the housing by the recess portion and the projecting portion being fitted to each other, the stator is configured by an annular insulator having an attachment surface being brought into close contact with a core end surface at one axial end of a stator core, a sensor substrate is attached to the (Continued)

insulator so as to be capable of detecting a rotation angle of a rotor, the recess portion of the stator is configured by a cutout portion being formed in an area that is a part of an outer circumferential surface of the insulator and includes a portion that is brought into close contact with the core end surface.

5 Claims, 6 Drawing Sheets

(51) Int. Cl.
| | | |
|---|---|---|
| H02K 1/18 | (2006.01) | |
| H02K 3/34 | (2006.01) | |
| H02K 11/21 | (2016.01) | |
| H02K 11/30 | (2016.01) | |
| H02K 5/08 | (2006.01) | |
| H02K 5/15 | (2006.01) | |
| H02K 21/16 | (2006.01) | |
| H02K 5/04 | (2006.01) | |
| H02K 5/14 | (2006.01) | |
| H02K 15/02 | (2006.01) | |
| H02K 15/03 | (2006.01) | |
| H02K 21/14 | (2006.01) | |

(52) U.S. Cl.
CPC .............. *H02K 5/15* (2013.01); *H02K 11/21* (2016.01); *H02K 11/30* (2016.01); *H02K 21/16* (2013.01); *H02K 29/08* (2013.01); *H02K 5/04* (2013.01); *H02K 5/14* (2013.01); *H02K 5/16* (2013.01); *H02K 15/028* (2013.01); *H02K 15/03* (2013.01); *H02K 21/14* (2013.01)

(58) Field of Classification Search
CPC .......... H02K 11/30; H02K 11/21; H02K 1/18; H02K 3/34; H02K 5/08; H02K 21/16; H02K 29/08; H02K 15/028; H02K 21/14
USPC .......................................................... 310/89
See application file for complete search history.

(56) References Cited

FOREIGN PATENT DOCUMENTS

| | | | |
|---|---|---|---|
| EP | 2251956 A2 | * | 11/2010 |
| JP | 2007-295773 A | | 11/2007 |
| JP | 2007-330065 A | | 12/2007 |
| JP | 2008-312393 A | | 12/2008 |
| JP | 2011-041359 A | | 2/2011 |
| JP | 5025999 B2 | | 9/2012 |
| JP | 2013-094062 A | | 5/2013 |
| JP | 5483217 B2 | * | 5/2014 |
| KR | 20080099793 A | * | 11/2008 |

* cited by examiner (a)

PRIOR ART (b)

INNER-ROTOR-TYPE MOTOR AND ELECTRIC TOOL PROVIDED WITH SAME

RELATED APPLICATIONS

This application is the U.S. National Phase under 35 U.S.C. § 371 of International Patent Application No. PCT/JP2015/005618, filed on Nov. 11, 2015, which in turn claims the benefit of Japanese Application No. 2014-241629, filed on Nov. 28, 2014, the disclosures of which Applications are incorporated by reference herein.

TECHNICAL FIELD

The present invention relates to an inner-rotor-type motor and an electric tool provided with the inner-rotor-type motor.

BACKGROUND ART

In general, an inner-rotor-type motor includes a housing, a stator fixed to the housing, and a rotor provided in the stator. In particular, in a motor in which the rotor is a permanent magnet, a magnetic pole strength generated by the stator is controlled by detecting the magnetic pole position of the rotor in order to prevent a step-out and a synchronization loss. For this purpose, such a motor includes a sensor substrate on which a magnetic sensor such as a hall element is mounted. The sensor substrate is usually provided at a position axially spaced apart from the rotor. In order to enhance the accuracy of detection of the magnetic pole position of the rotor by the sensor substrate, the magnetic sensor and the rotor need to be spaced apart from each other by a certain distance. Because the rotor does not make a relative movement in the axial direction with respect to the housing, the magnetic sensor and the rotor can be spaced apart from each other by a certain distance by determining the relative position of the sensor substrate with respect to the rotor and fixing the sensor substrate to the housing.

However, if the sensor substrate is attached directly to the housing, a problem arises in that the durability of the sensor substrate is compromised. For example, if a motor as described above is used as the power source in an electric tool such as an impact driver, vibration occurs due to the environment or the operation of the motor itself. The vibration causes a stress concentration in the attachment portion where the sensor substrate and the housing are attached, which may compromise the durability of the sensor substrate.

For this reason, for example, Patent Literature 1 (PTL 1) discloses a structure for indirectly fixing a sensor substrate to a housing by fixing the sensor substrate to a stator and fixing the stator to the housing. The stator disclosed in PTL 1 includes a cylindrical stator core and an annular insulator provided on opposing sides in the axial direction of the stator core. An engagement projecting portion is provided on an outer circumferential surface of one of two insulators, and an engagement recess portion is provided on an inner circumferential surface of the housing. As a result of the engagement projecting portion and the engagement recess portion being fitted to each other, the stator is positioned with respect to the housing in the axial direction. PTL 1 also discloses a configuration in which an engagement recess portion is provided on the outer circumferential surface of one of the two insulators and an engagement projecting portion is provided on the inner circumferential surface of the housing. In either case, the sensor substrate is fixed to one of the two insulators that is used to position the stator with respect to the housing. This is to prevent the accuracy of positioning of the sensor substrate from lowering due to an error in the axial length of the stator core. In general, a stator core is composed of a stack of steel plates, and for this reason, the thickness of the stator core includes accumulated thickness errors of the steel plates. If the part of the insulator that is used to perform positioning with respect to the housing and the part of the insulator that is used to fix the sensor substrate are different, the sensor substrate is fixed not only to the insulator but also to the housing via the stator core. Accordingly, with the configuration, the relative position of the sensor substrate with respect to the housing in the axial direction varies due to an error in the axial length of the stator core, and the accuracy of positioning of the sensor substrate in the axial direction is lowered.

CITATION LIST

Patent Literature

PTL 1: Japanese Patent No. 5025999

SUMMARY OF THE INVENTION

Technical Problem

According to the technique disclosed in PTL 1, it is stated that the engagement recess portion may be provided on either the inner circumferential surface of the housing or the outer circumferential surface of the insulator. However, in the case of a configuration in which the engagement recess portion is provided on the inner circumferential surface of the housing, it is necessary to increase the thickness of the housing in the radial direction, as compared with a configuration in which the engagement recess portion is provided on the inner circumferential surface of the insulator. In order to maintain a sufficient strength of the housing, the engagement recess portion of the housing needs to have a certain degree of thickness. This is because the thickness of the housing needs to be increased in the radial direction by an amount corresponding to the height of the projecting portion provided on the outer circumferential surface of the insulator, as compared with a configuration in which the engagement projecting portion is provided on the inner circumferential surface of the housing and a portion of the housing excluding the engagement projecting portion has a certain degree of thickness. Accordingly, from the viewpoint of preventing an increase in the size of the motor in the radial direction, it is preferable to use the configuration in which the engagement projecting portion is provided on the inner circumferential surface of the housing and the engagement recess portion is provided on the outer circumferential surface of the insulator.

With the technique disclosed in PTL 1, however, if the recess portion is provided on the outer circumferential surface of the insulator, it is not possible to reduce the axial thickness of the insulator. In FIG. 6, (a) is a cross-sectional view of a DC brushless motor according to PTL 1, taken along the axial direction. Stator core 11A is covered by insulator 12A, and sensor substrate 14A including hall element 17A is fixed to insulator 12A. Insulator 12A is positioned by engagement recess portion 19A provided at the center of the outer circumferential surface of insulator 12A and engagement projecting portion 18A provided on the inner circumferential surface of housing 13A being fitted to each other. In FIG. 6, (b) is an enlarged view of an area where the outer circumferential surface of insulator 12A and the inner circumferential surface of housing 13A are fitted to each other. In order to maintain the strength of insulator 12A with engagement recess portion 19A being provided at the center of the outer circumferential surface of insulator 12A, two regions in insulator 12A that are located on opposing sides of engagement recess portion 19A need to have a certain degree of axial thickness. In other words, in both region 21A that is closer to stator core 11A than engagement recess portion 19A and region 22A that is closer to sensor substrate 14A than engagement recess portion 19A, it is necessary to ensure a certain degree of axial thickness of insulator 12A. This increases the lower limit value of the thickness of the insulator and also increases the axial length of the housing, which causes an increase in the size of the motor.

It is an object of the present invention to provide an inner-rotor-type motor whose size is prevented from increasing by a method for positioning the stator in the axial direction, and an electric tool including such an inner-rotor-type motor.

Solution to Problem

An inner-rotor-type motor according to one aspect of the present invention is an inner-rotor-type motor including: a housing; a stator fixedly provided in a housing; a rotor coaxially provided in the stator; and a sensor substrate provided at one axial end of the stator, and a projecting portion is formed on an inner circumferential surface of the housing, a recess portion is formed on an outer circumferential surface of the stator, the stator is positioned with respect to the housing by the recess portion and the projecting portion being fitted to each other, the stator is configured as a result of an annular insulator having an attachment surface being brought into close contact with a core end surface provided at one axial end of a stator core, the sensor substrate is attached to the insulator so as to be capable of detecting a rotation angle of the rotor, and the recess portion of the stator is configured as a result of a cutout portion being formed in an area that is a part of an outer circumferential surface of the insulator and includes a portion that is brought into close contact with the core end surface.

Advantageous Effects of Invention

With the configuration described above, the projecting portion of the housing is fitted into the recess portion of the stator, which makes it impossible for the stator to make a relative movement in the axial direction with respect to the housing, and thus the stator can be positioned with respect to the housing. Also, because the housing has the projecting portion on its inner circumferential surface, in a portion of the housing excluding the projecting portion, the radial thickness of the housing can be reduced. Furthermore, because the recess portion of the stator is configured by a first end surface of the stator core and a cutout portion formed in the insulator, it is possible to reduce the axial thickness of the insulator. This is because with the configuration described above, the recess portion of the stator is provided on a second end surface side of the insulator. In the case where, as in PTL 1, the recess portion of the stator is provided at the center of the insulator, as described above, in two regions that are on opposing sides of the recess portion, the insulator needs to have a certain degree of thickness or more. In contrast, with the configuration described above, in order to maintain the strength of the insulator, it is only necessary to configure the insulator to have a certain degree of thickness or more in only one region between an end surface that is opposite to the second end surface and the cutout portion. Accordingly, as compared with the configuration in which the recess portion of the stator is provided at the center of the insulator, the axial thickness of the insulator can be reduced. As a result, it is possible to prevent an increase in the size of the inner-rotor-type motor in both the radial direction and the axial direction.

Figure 2:
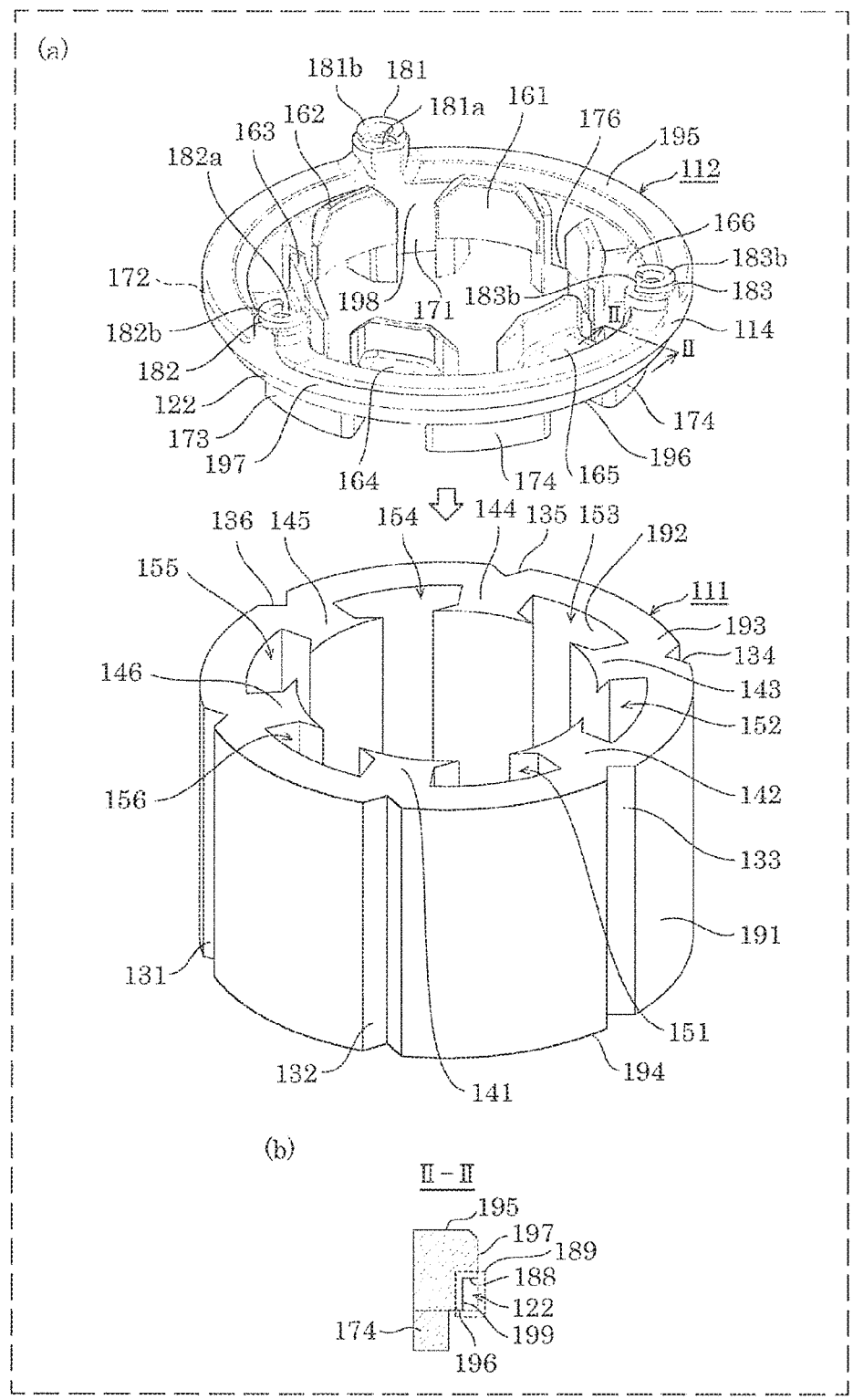

(a) in FIG. 2 is an exploded view showing the structures of a stator core and an insulator that are included in the DC brushless motor according to the embodiment, and (b) in FIG. 2 is a cross-sectional view of the insulator taken along the line II-II.

Figure 3:
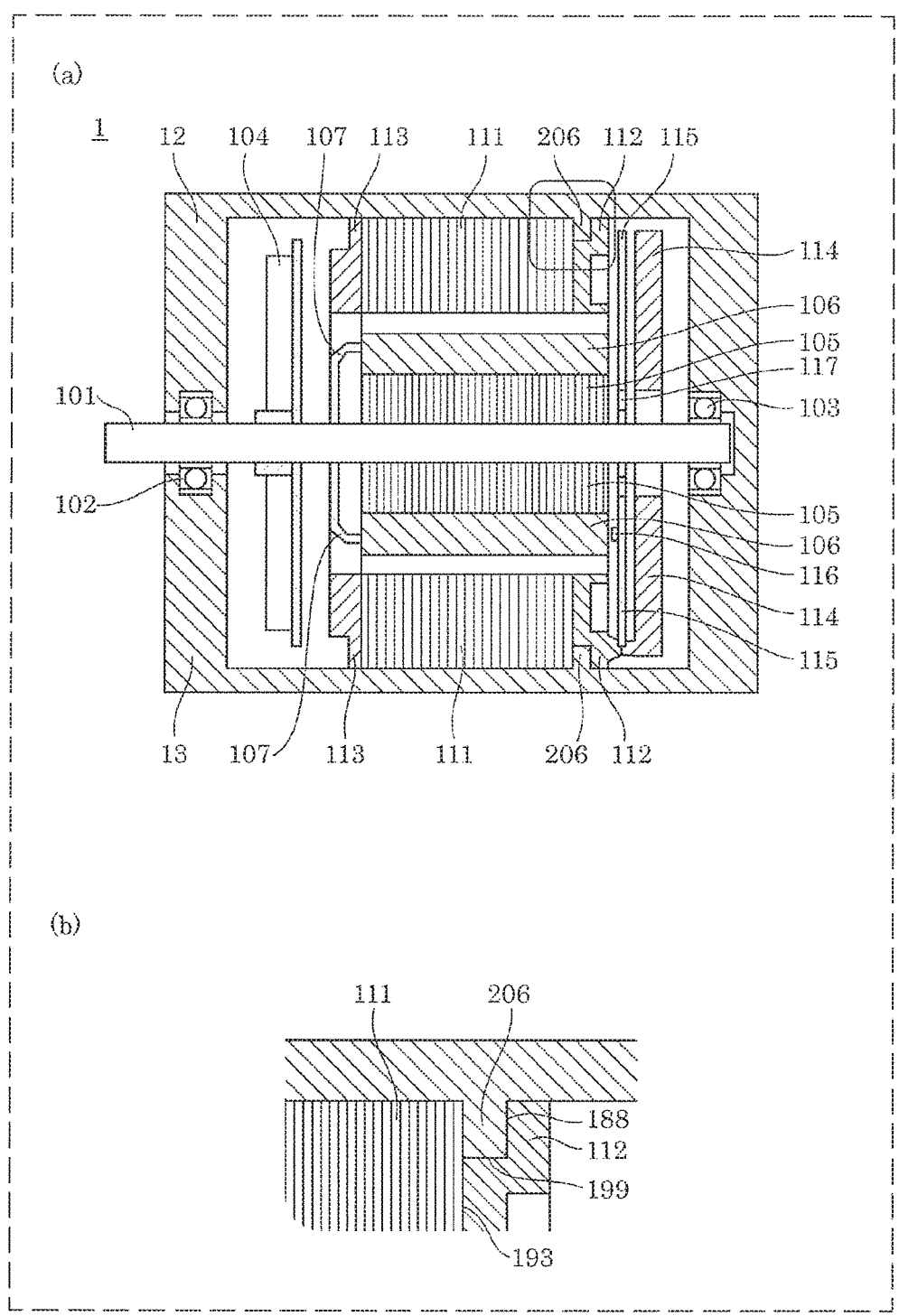

(a) in FIG. 3 is a cross-sectional view of the DC brushless motor according to the embodiment taken along the axial direction, and (b) in FIG. 3 is an enlarged view of a portion where a stator and a housing are fitted, in the cross-sectional view of the DC brushless motor according to the embodiment.

Figure 4:
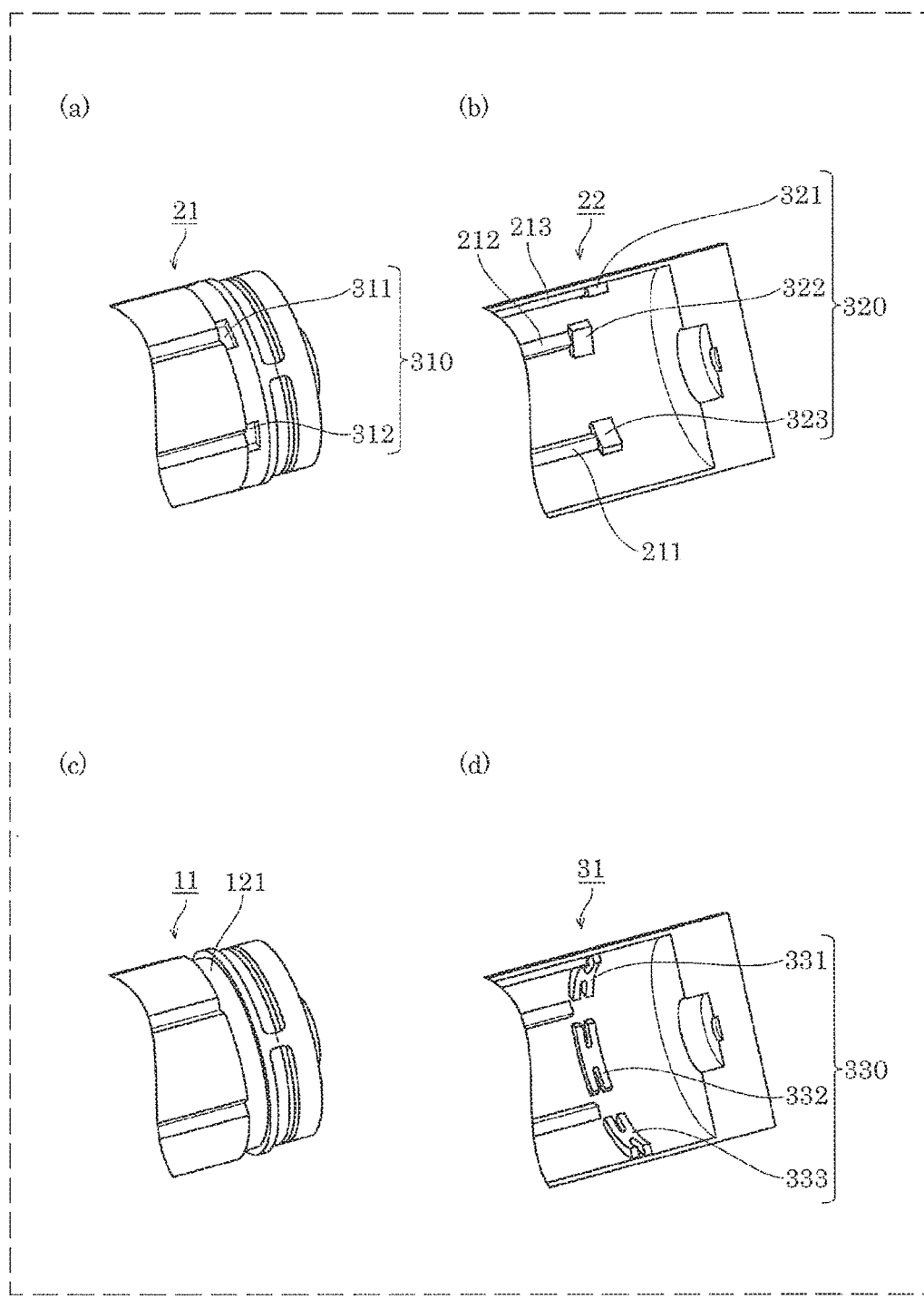

(a) in FIG. 4 is a schematic diagram of a stator according to Variation 1, (b) in FIG. 4 is a schematic diagram of a first half casing according to Variation 1, (c) in FIG. 4 is a schematic diagram of a stator according to Variation 2, and (d) in FIG. 4 is a schematic diagram of a first half casing according to Variation 2.

Figure 5:
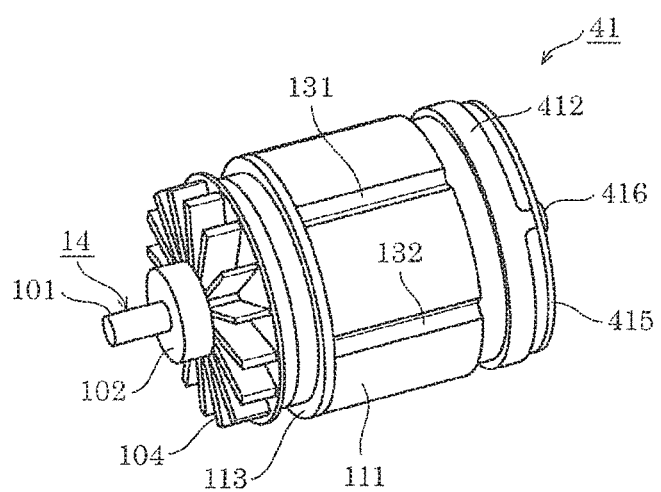

FIG. 5 is a schematic diagram of a stator according to Variation 3.

Figure 6:
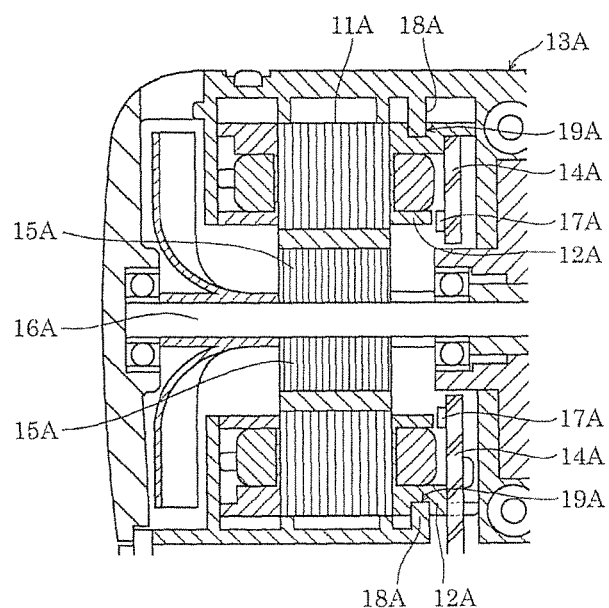
Figure 6:
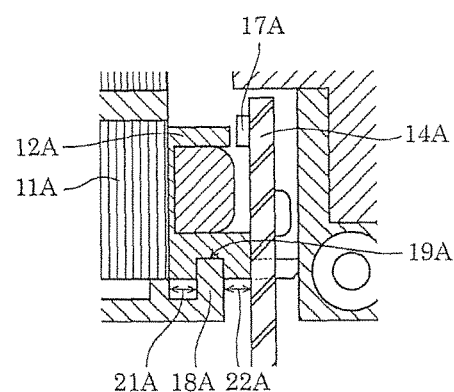

(a) in FIG. 6 is a cross-sectional view of a conventional DC brushless motor, and (b) in FIG. 6 is an enlarged view of a portion where a stator and a housing are engaged, in the cross-sectional view of the conventional DC brushless motor.

DESCRIPTION OF EXEMPLARY EMBODIMENT

Hereinafter, an embodiment of the present invention will be described. Note that the embodiment described below shows a preferred specific example of the present invention. Accordingly, the numerical values, shapes, materials, structural elements, the arrangement and connection of the structural elements, and the like shown in the following embodiment are merely examples, and therefore are not intended to limit the scope of the present invention. Accordingly, among the structural elements described in the following embodiment, structural elements not recited in any one of the independent claims are described as arbitrary structural elements.

In addition, the diagrams are schematic representations, and thus are not necessarily true to scale. Also, in the diagrams, structural elements that are substantially the same are given the same reference numerals, and a redundant description will be omitted or simplified.

EMBODIMENT

Hereinafter, an embodiment of the present invention will be described with reference to the drawings.

Figure 1:
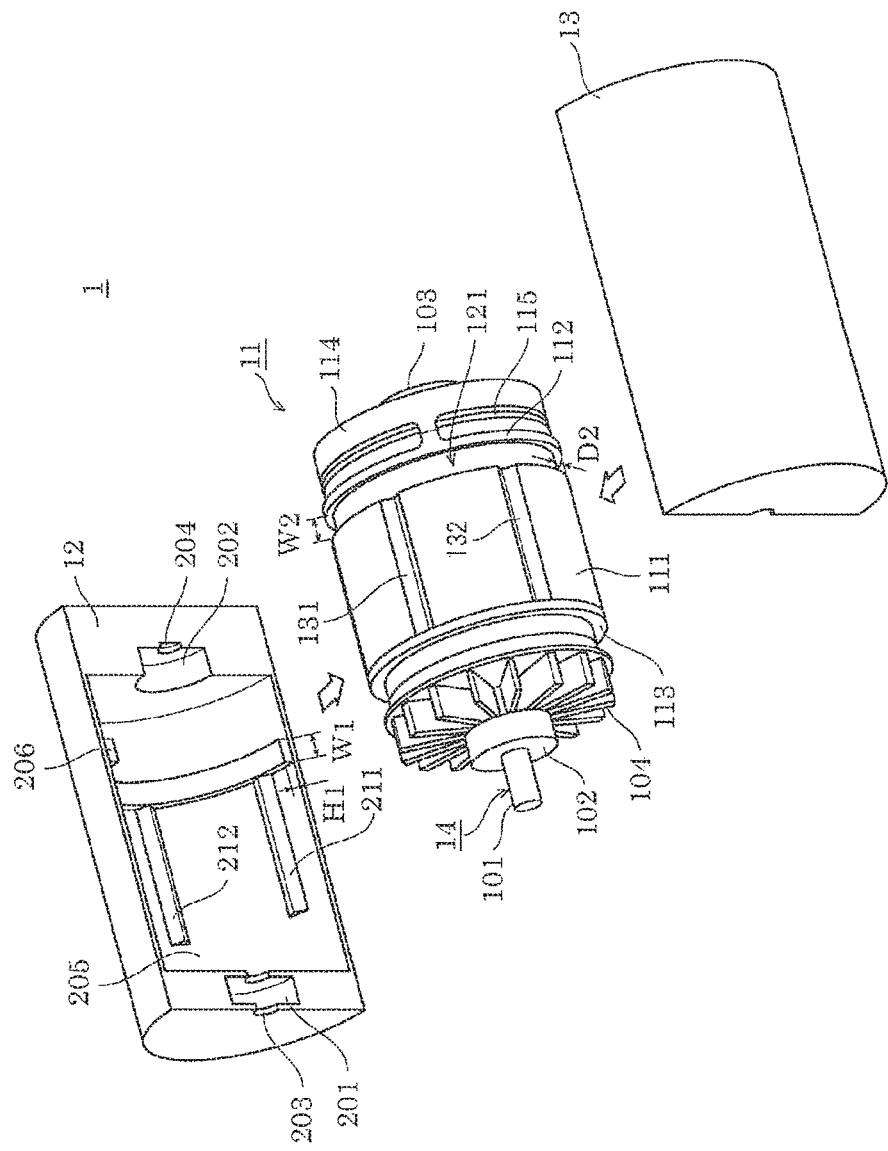
FIG. 1 is an exploded perspective view of a DC brushless motor according to an embodiment.

FIG. 1 is an exploded perspective view of DC brushless motor 1 according to the embodiment. As shown in FIG. 1, its housing has a structure that is split along an axially extending split surface into two lateral parts and thus is composed of first half casing 12 and second half casing 13. First half casing 12 and second half casing 13 are coupled by, for example, a faster such as a combination of a bolt and a nut, an engagement structure such as a combination of an engagement claw and an engagement recess portion that mates with the engagement claw, or an adhesive.

Stator 11 includes stator core 111, insulator 112, insulator 113, heat dissipator 114, and sensor substrate 115. In stator 11 shown in FIG. 1, rotor 14 including shaft 101 and cooling fan 104 is provided inside stator 11 by being supported by bearing 102 and bearing 103.

Stator core 111 and insulator 112 are shown in detail in (a) in FIG. 2. Stator core 111 has a cylindrical shape, and is composed of, for example, a stack of steel plates that are stacked in the axial direction. As used herein, the axial direction refers to a direction extending along the axis of shaft 101. On inner circumferential surface 192 of stator core 111, six teeth 141, 142, 143, 144, 145, and 146 (141 to 146) are provided at six circumferentially equally divided positions. Also, on outer circumferential surface 191 of stator core 111, V-shaped engagement groove portions 131, 132, 133, 134, 135, and 136 (131 to 136) are provided at six circumferentially equally divided positions. Engagement groove portions 131 to 136 are formed along the axial direction. Engagement groove portions 131 to 136 are formed at positions on the outer circumferential side of teeth 141 to 146. Core end surface 193 that is one of end surfaces of stator core 111 is covered by insulator 112, and end surface 194 that is the other surface is covered by insulator 113.

Insulator 112 has sensor fixing surface 195, attachment surface 196, outer circumferential surface 197, and inner circumferential surface 198. As will be described later, insulator 112 is an annular insulator having protrusion-like screw holes on sensor fixing surface 195, and is made of, for example, nylon or the like. Insulator 112 has the same outer diameter as the outer diameter of stator core 111. On inner circumferential surface 198 of insulator 112, six inverted U-shaped coil insulating portions 161, 162, 163, 164, 165, and 166 (161 to 166) are provided. Also, engagement projecting portions 171, 172, 173, 174, 175, and 176 (171 to 176) that correspond to tooth gaps 151, 152, 153, 154, 155, and 156 (151 to 156) of stator core 111 are provided on attachment surface 196 of insulator 112 As a result of engagement projecting portions 171 to 176 of insulator 112 being engaged into tooth gaps 151 to 156 of stator core 111, coil insulating portions 161 to 166 respectively cover end surfaces of teeth 141 to 146. Although not shown in the diagram, likewise, insulator 113 covers end surfaces of teeth 141 to 146 of stator core 111. Drive coils (not shown) are configured by wiring being wound around portions of teeth 141 to 146 that are covered by insulator 112 and insulator 113.

Cutout portion 122 is formed so as to extend in the circumferential direction around the entire circumference of an area that is a part of outer circumferential surface 197 of insulator 112 and includes attachment surface 196 that comes into close contact with core end surface 193 of stator core 111. (b) in FIG. 2 shows a cross-sectional view of insulator 112 taken along the line II-II. To be specific, cutout portion 122 is formed in outer rim region 189 where an imaginary annular region having a certain amount of thickness extending from outer circumferential surface 197 of insulator 112 toward the inner circumferential side and an imaginary annular region having a certain amount of thickness extending from attachment surface 196 toward sensor fixing surface 195 overlap with each other. In other words, outer rim region 189 refers to an imaginary annular region including an annular rim supposed to be formed by outer circumferential surface 197 and attachment surface 196 and the periphery of the rim. That is, insulator 112 has a shape in which an annular rim supposed to be formed by outer circumferential surface 197 and attachment surface 196 and the periphery of the rim are cut out by cutout portion 122. Due to cutout portion 122, there is a step in the outer circumferential surface, and second outer circumferential surface 199 having a diameter smaller than that of outer circumferential surface 197 and annular end surface 188 that connects second outer circumferential surface 199 and inner circumferential surface 198 are thereby formed. Accordingly, when stator 11 is assembled by bonding insulator 112 and stator core 111, core end surface 193 of stator core 111 faces end surface 188, and thereby forming two opposing side surfaces of positioning recess portion 121. At the same time, second outer circumferential surface 199 forms the bottom surface of positioning recess portion 121. Positioning recess portion 121 is thereby formed as an annular groove that extends around the entire outer circumferential surface of stator 11.

On sensor fixing surface 195 of insulator 112, screw holes 181, 182, and 183 (181 to 183) are formed at three equally divided positions of the outer circumference that do not overlap with coil insulating portions 161 to 166. Screw holes 181 to 183 are formed to rise from sensor fixing surface 195, and regions 181a, 182a, and 183a (181a to 183a) that have an angle of about 120° and are close to shaft 101 are formed to be lower than other regions 181b, 182b, and 183b (181b to 183b). Regions 181a to 183a come into direct contact with sensor substrate 115, and other regions 181b to 183b come into direct contact with heat dissipator 114. In other words, as shown in FIG. 3 illustrating a cross-sectional view of DC brushless motor 1, insulator 112 and heat dissipator 114 are screwed together, with sensor substrate 115 interposed therebetween, and thus sensor substrate 115 is firmly fixed to insulator 112.

Referring back to FIG. 1, as described above, heat dissipator 114 is fixed to insulator 112 by three screws (not shown), and supports sensor substrate 115 so as to sandwich sensor substrate 115 together with insulator 112. Heat dissipator 114 has an annular shape, and has the same structure as that of insulator 112 except that coil insulating portions 161 to 166 and engagement projecting portions 171 to 176 are not provided, and heat dissipator 114 is not cut out by cutout portion 122. Heat dissipator 114 is provided to dissipate heat from sensor substrate 115, and thus is made of a metal having a high thermal conductivity such as, for example, aluminum. Heat dissipator 114 has an outer diameter that is equal to the outer diameter of insulator 112.

As shown in FIG. 3, sensor substrate 115 has a disc shape and has escape hole 117 at the center through which shaft 101 is passed. Sensor substrate 115 has an outer diameter that is substantially equal to the diameter of a circle around the axis of shaft 101 including regions 181a to 183a of screw holes 181 to 183. Also, on a surface of sensor substrate 115 that is on a side where stator core 111 is provided, three magnetic sensors including magnetic sensor 116 are provided equidistantly along escape hole 117. The magnetic sensors are, for example, hall elements. With the magnetic sensors, the magnetic pole position of rotor 14 is detected, and rotor 14 can be driven by supplying an electric current to the drive coils formed by teeth 141 to 146.

As described above, insulator 113 covers end surface 194 of stator core 111. Insulator 113 has substantially the same structure as that of insulator 112 except that screw holes 181 to 183 are not provided and insulator 113 is not cut out by cutout portion 122.

The structure of rotor 14 will be described with reference to FIG. 3. Rotor 14 includes, on shaft 101, rotor core 105 in which disc-shaped steel plates are stacked, and four-pole ring magnet 106 that is supported by holder 107 and is configured to surround rotor core 105. Ring magnet 106 is provided at a position facing the drive coils of the stator. Also, rotor 14 includes cooling fan 104 provided on shaft 101 between rotor core 105 and bearing 102.

Referring back to FIG. 1, a description of the housing will be given. Second half casing 13 has the same internal structure as that of first half casing 12, and thus an illustration and a detailed description thereof are omitted.

First half casing 12 includes stator housing portion 205 in which stator 11 is housed, and bearing housing portions 201 and 202 in which bearings 102 and 103 are respectively housed.

On an inner circumferential surface of first half casing 12 that faces stator housing portion 205, positioning projecting portion 206 that is a projecting portion that extends in an arc and rotation inhibiting projecting portions 211, 212, and 213 (211 to 213) that are projecting portions that extend in the axial direction are provided. Axial width W1 of positioning projecting portion 206 is equal to axial width W2 of positioning recess portion 121, and height H1 of positioning projecting portion 206 is equal to depth D2 of positioning recess portion 121. Also, rotation inhibiting projecting portions 211 to 213 have a width and height that are equal to the width and depth of engagement groove portions 131 to 136.

When stator 11 is housed in stator housing portion 205, positioning projecting portion 206 is fitted into positioning recess portion 121 of stator 11. In other words, positioning projecting portion 206 of first half casing 12 and positioning recess portion 121 of stator 11 are fitted to each other without a gap. Stator 11 is thereby positioned in the axial direction with respect to first half casing 12. That is, stator 11 is positioned in the axial direction with respect to the housing. Furthermore, sensor substrate 115 is indirectly positioned in the axial direction with respect to the housing. Also, rotation inhibiting projecting portions 211 to 213 are fitted into three adjacent ones of engagement groove portions 131 to 136. With this configuration, the rotation of stator 11 with respect to the housing is inhibited.

(b) in FIG. 3 is an enlarged view of an area where positioning projecting portion 206 of first half casing 12 is fitted into positioning recess portion 121 of stator 11, in the cross-sectional view of (a) in FIG. 3. As shown in (b) in FIG. 3, insulator 112 and stator core 111 sandwich positioning projecting portion 206 of first half casing 12. Accordingly, the axial thickness of insulator 112 needs to ensure the strength of a region from end surface 188 to sensor fixing surface 195. As a result, the axial thickness of insulator 112 can be reduced, and consequently the axial length of DC brushless motor 1 itself can be reduced.

<Variation 1>

(a) in FIG. 4 and (b) in FIG. 4 show a positioning projecting portion and a positioning recess portion according Variation 1. (a) in FIG. 4 shows positioning recess portion 310 formed in stator 21. Positioning recess portion 310 includes six dents that are equidistantly provided in the circumferential direction and have the same width in the axial direction and the same length in the circumferential direction. (a) in FIG. 4 shows only dents 311 and 312 out of the six dents constituting positioning recess portion 310. (b) in FIG. 4 shows positioning projecting portion 320 formed in first half casing 22. Positioning projecting portion 320 includes three protrusions 321, 322, and 323 (321 to 323) that are equidistantly provided in the circumferential direction so as to correspond to positioning recess portion 310, and have the same width in the axial direction and the same length in the circumferential direction.

With this configuration, when stator 21 is housed in first half casing 22, positioning recess portion 310 of stator 21 and positioning projecting portion 320 of first half casing 22 are fitted to each other. Accordingly, even with a configuration in which the positioning projecting portion and the positioning recess portion are not configured to be uniform and continuous in the circumferential direction as in the above-described embodiment, the stator and the sensor substrate can be positioned in the axial direction.

<Variation 2>

(c) in FIG. 4 and (d) in FIG. 4 show a positioning projecting portion and a positioning recess portion according to Variation 2. (c) in FIG. 4 shows positioning recess portion 121 that is formed as a groove that extends in the circumferential direction around the entire circumference of stator 11. In other words, the structure of the positioning recess portion according to the present variation is exactly the same as that of the above-described embodiment. On the other hand, (d) in FIG. 4 shows positioning projecting portion 330 provided in first half casing 31. Positioning projecting portion 330 includes three protrusions 331, 332, and 333 (331 to 333) of the same shape that are equidistantly provided in the circumferential direction. Protrusions 331 to 333 are H shaped, and their axial width is the same as the axial width of positioning recess portion 121.

Accordingly, when stator 11 is housed in first half casing 31, although there is a gap between positioning projecting portion 330 of first half casing 31 and positioning recess portion 121 of stator 11, stator 11 is in a state in which it cannot make a relative movement in the axial direction with respect to first half casing 31. In other words, positioning projecting portion 330 of first half casing 31 and positioning recess portion 121 of stator 11 are firmly fitted to each other in the axial direction. Accordingly, stator 11 can be positioned in the axial direction with respect to first half casing 31. Accordingly, the positioning projecting portion and the positioning recess portion need not be configured to be fitted to each other without a gap. As long as they are configured to be firmly fitted to each other in the axial direction, the stator and the sensor substrate can be positioned in the axial direction as in the embodiment described above.

<Variation 3>

FIG. 5 shows an insulator and a sensor substrate according to a variation. Stator 41 according to the present variation does not include a heat dissipator for the sensor substrate, and sensor substrate 415 is directly fixed to insulator 412. To be specific, insulator 412 has the same configuration as that of insulator 112 except that in three screw holes, a step as that formed between region 181a and region 181b is not formed. Sensor substrate 415 has screw through holes that correspond to the three screw holes of insulator 412. Sensor substrate 415 is screwed to insulator 112 by three screws 416 inserted into the screw holes of insulator 412 via the screw through holes of sensor substrate 415.

With this configuration, even when a heat dissipator is not provided, the stator and the sensor substrate can be positioned in the axial direction.

<Other Variations of Embodiment>

(1) In the embodiment, an example was described in which positioning projecting portion 206 of first half casing 12 has height H1 and width W1 that are equal to depth D2 and width W2 of positioning recess portion 121 of stator 11, but the present invention is not necessarily limited thereto. For example, depth D2 of positioning recess portion 121 may be smaller than height H1 of positioning projecting portion 206. Even in this case, positioning projecting portion 206 of first half casing 12 and positioning recess portion 121 of stator 11 are firmly fitted to each other in the axial direction, and thus the stator and the sensor substrate can be positioned in the axial direction.

Also, the shapes of the positioning projecting portion and the positioning recess portion are not limited to those described in the embodiment and Variations 1 and 2 as long as they can be firmly fitted to each other in the axial direction. For example, the positioning recess portion may be an annular groove, and the positioning projecting portion may be a ladder-like protrusion having an axial width that is the same as the axial width of the positioning recess portion. Also, in Variation 1, protrusions 321 to 323 may have a circumferential length shorter than the circumferential length of dents 311 and 312, and may be H-shaped protrusions as in Variation 2.

The same applies to the relationship between rotation inhibiting projecting portions 211 to 213 and engagement groove portions 131 to 136. The configurations of rotation inhibiting projecting portions 211 to 213 and engagement groove portions 131 to 136 are not limited to those described in the embodiment and Variation 1 and 2 as long as they can be firmly fitted to each other in the circumferential direction. For example, rotation inhibiting projecting portions 211 to 213 may have a height smaller than the depth of engagement groove portions 131 to 136.

(2) In the embodiment and Variations 1 and 2, an example was described in which stator core 111 and insulator 112 have the same outer diameter. However, the present invention is not necessarily limited thereto. For example, the outer diameter of insulator 112 may be smaller than the outer diameter of stator core 111. Even in this case, the outer diameter of second outer circumferential surface 199 of insulator 112 is smaller than the outer diameter of outer circumferential surface 197, and it is therefore possible to form positioning recess portion 121. If the outer diameter of insulator 112 is larger than the outer diameter of stator core 111, it is necessary to increase the size of stator housing portion 205, which leads to an increase in the size of the motor. For this reason, the outer diameter of insulator 112 is preferably less than or equal to the outer diameter of stator core 111.

Likewise, the outer diameter of heat dissipator 114 may be smaller than the outer diameter of insulator 112. Also, the outer diameter of sensor substrate 115 may be an outer diameter that is less than or equal to the outer diameter of heat dissipator 114 and is greater than or equal to the outer diameter of ring magnet 106. Sensor substrate 115 need not be sandwiched between insulator 112 and heat dissipator 114, and may be directly fixed to insulator 112. Alternatively, sensor substrate 115 may be indirectly fixed to insulator 112 via heat dissipator 114, such as for example, sensor substrate 115 being fixed to heat dissipator 114, and heat dissipator 114 being fixed to insulator 112.

(3) In the embodiment and Variations 1 and 2, an example was described in which the relative movement in the axial direction between stator 11 and the housing is limited only by fitting between the positioning projecting portion and the positioning recess portion. However, the present invention is not necessarily limited thereto. For example, on the inner circumferential surface of first half casing 12 that faces stator housing portion 205, a partition wall may be provided at a position corresponding to a position between insulator 113 and cooling fan 104. At this time, stator housing portion 205 is divided by the partition wall into a cooling fan housing portion in which cooling fan 104 is housed and a stator housing portion in which rotor 14 other than cooling fan 104 and stator 11 are housed. Accordingly, the movement of stator 11 in the direction of cooling fan 104 can be limited by the partition wall. Note, however, that in order to not interfere with the positioning resulting from the fitting between positioning recess portion 121 and positioning projecting portion 206, it is preferable that the partition wall does not firmly fix stator 11, or does not apply a compressive stress to stator 11 in the axial direction. This is because due to an error in the axial length, thermal expansion and the like of stator core 111, a stress may be applied to the area where positioning recess portion 121 and positioning projecting portion 206 are fitted to each other, which may lower the accuracy of positioning. The configuration for limiting the movement of stator 11 is not limited to the partition wall, and may be, for example, a member that holds insulator 113.

(4) In the embodiment and Variations 1 and 2, an example was described in which as viewed from stator 11, sensor substrate 115 is attached on the side opposite to the side where cooling fan 104 is provided, and rotating shaft 101 extends outside the housing on the side where cooling fan 104 is provided. However, the present invention is not necessarily limited thereto. For example, cooling fan 104 may be provided on the same side as the side where sensor substrate 115 is provided as viewed from stator 11, and rotating shaft 101 may extend to the outside on the side where sensor substrate 115 is provided. Also, cooling fan 104 may be provided on each of the opposing sides of stator 11, or no fan may be provided in DC brushless motor 1.

(5) In the embodiment and Variations 1 and 2, an example was described in which the DC brushless motor has a specific housing. However, the present invention is not necessarily limited thereto. For example, in the case where DC brushless motor 1 according to the embodiment is used as a power source for an electric tool such as an impact driver, DC brushless motor 1 according to the embodiment may be incorporated as a part of the electric tool. Alternatively, a part of the housing of the electric tool may be used as a motor housing portion, and the structural elements of DC brushless motor 1 other than the housing may be incorporated in the motor housing portion. In the configuration in which a part of the housing of the electric tool is used as a motor housing portion, the positioning projecting portion can be provided on the inner circumferential surface of the motor housing portion in the housing of the electric tool.

(6) In the embodiment and Variations 1 and 2, an example was described in which stator 11 includes six drive coils, and rotor 14 includes four-pole ring magnet 106. However, the present invention is not necessarily limited thereto. For example, stator 11 may include eight drive coils, or may include ten drive coils. In this case, stator core 111 includes a number of teeth corresponding to the number of drive coils, and insulator 112 includes a number of coil insulating portions and a number of engagement projecting portions corresponding to the number of drive coils. Also, rotor 14 may include a two-pole or six-pole ring magnet.

Also, motor 1 is not limited to a DC brushless motor, and may be an inner-rotor-type synchronous electric motor including a sensor that includes an electromagnetic as a stator and detects a rotor angle, such as a stepping motor or a servo motor.

<Summation>

As described above, inner-rotor-type motor 1 according to the embodiment includes housings 12 and 13, stator 11 fixedly provided in housings 12 and 13, rotor 14 coaxially provided in stator 11, and sensor substrate 115 provided at one axial end of stator 11. Projecting portion 206 is formed on the inner circumferential surface of each of housings 12 and 13. Recess portion 121 is formed on the outer circumferential surface of stator 11, and stator 11 is positioned with respect to housings 12 and 13 by recess portion 121 and projecting portion 206 being fitted to each other. Stator 11 is configured by annular insulator 112 having attachment surface 196 being brought into close contact with core end surface 193 provided at one axial end of stator core 111. Sensor substrate 115 is attached to insulator 112 so as to be capable of detecting the rotation angle of rotor 14. Recess portion 121 of stator 11 is configured as a result of cutout portion 122 being formed in area 189 that is a part of outer circumferential surface 197 of insulator 112 and includes a portion that is brought into close contact with core end surface 193. Accordingly, insulator 112 and stator core 111 sandwich positioning projecting portion 206 provided in each of housings 12 and 13. Accordingly, the axial thickness of insulator 112 can be set taking into consideration only a region from cutout portion 122 to sensor fixing surface 195. As a result, the axial length of motor 1 can be reduced. Also, housings 12 and 13 do not include a recess portion, it is also possible to reduce the radial size of motor 1.

Also, a maximum outer diameter value of a region of outer circumferential surface 197 of insulator 112 excluding cutout portion 122 is less than or equal to a maximum outer diameter value of stator core 111. With this configuration, it is possible to prevent housings 12 and 13 from increasing in size in the radial direction, and achieves miniaturization of the motor.

Also, cutout portion 122 is continuous around the entire circumference of insulator 112, and (positioning) recess portion 121 of stator 11 is an annular groove. With this configuration, positioning recess portion 121 can be easily implemented with a simple configuration that is uniform in the circumferential direction.

Also, (positioning) projecting portion 330 of housing 31 may axially include two or more protrusions 331 to 333 having the same width as the axial width of (positioning) recess portion 121 of stator 11. In other words, projecting portion 330 and recess portion 121 need not be configured to be fitted to each other without a gap. With the configuration as described above, the present disclosure can be carried out as long as the relative movement in the axial direction between stator 11 and housing 31 can be inhibited, and the positioning of stator 11 can be performed.

Also, the electric tool according to the present disclosure is an electric tool including any one of inner-rotor-type motors 1 described above.

The present invention has been described above based on the embodiment and Variations 1 to 3, but the present invention is not limited to the embodiment and variations described above. The present invention also encompasses embodiments obtained by making various modifications that can be conceived by a person having ordinary skill in the art to the above embodiment and variations as well as embodiments implemented by any combination of the structural elements and the functions of the above embodiment and variations without departing from the scope of the present invention.

The invention claimed is:

1. An inner-rotor-type motor comprising: a housing; a stator fixedly provided in the housing; a rotor coaxially provided in the stator; and a sensor substrate provided at one axial end of the stator, wherein a projecting portion is formed on an inner circumferential surface of the housing, a recess portion is formed on an outer circumferential surface of the stator, the stator is positioned with respect to the housing by the recess portion and the projecting portion being fitted to each other, the stator is configured as a result of an annular insulator having an attachment surface being brought into close contact with a core end surface provided at one axial end of a stator core, the sensor substrate is attached to the insulator so as to be capable of detecting a rotation angle of the rotor, the recess portion of the stator is configured as a result of a cutout portion being formed in an area that is a part of an outer circumferential surface of the insulator and includes a portion that is brought into close contact with the core end surface, and an axial width of the projecting portion is equal to an axial width of the recess portion, and a height of the projecting portion is equal to a depth of the recess portion.

2. The inner-rotor-type motor according to claim 1, wherein a maximum outer diameter value of a region of the outer circumferential surface of the insulator excluding the cutout portion is less than or equal to a maximum outer diameter value of the stator core.

3. The inner-rotor-type motor according to claim 1, wherein the cutout portion is continuous around an entire circumference of the insulator, and the recess portion of the stator is an annular groove.

4. The inner-rotor-type motor according to claim 3, wherein the projecting portion of the housing includes two or more protrusions having the same width in an axial direction as an axial width of the recess portion of the stator.

5. An electric tool comprising the inner-rotor-type motor according to claim 1.

* * * * *